(12) United States Patent
Wodzianek et al.

(10) Patent No.: US 7,287,162 B2
(45) Date of Patent: Oct. 23, 2007

(54) SYSTEM AND METHOD FOR PLATFORM ACTIVATION

(75) Inventors: Richard Wodzianek, Coquitlam (CA); Jody Pondick, North Vancouver (CA); Iulian Mocanu, Langley (CA); Kirstin Gulbransen, La Jolla, CA (US)

(73) Assignee: Sierra Wireless, Inc., Richmond, BC (CA)

( * ) Notice: Subject to any disclaimer, the term of this patent is extended or adjusted under 35 U.S.C. 154(b) by 617 days.

(21) Appl. No.: 10/017,212

(22) Filed: Dec. 13, 2001

(65) Prior Publication Data

US 2003/0115465 A1    Jun. 19, 2003

(51) Int. Cl.
*H04L 9/00* (2006.01)
*G06Q 10/00* (2006.01)

(52) U.S. Cl. .................. 713/172; 713/191; 705/65; 705/69; 380/277

(58) Field of Classification Search ............... 713/191, 713/172; 705/65, 69; 380/277
See application file for complete search history.

(56) References Cited

U.S. PATENT DOCUMENTS

| | | | | |
|---|---|---|---|---|
| 5,790,806 A * | 8/1998 | Koperda | ..................... | 709/252 |
| 5,960,445 A * | 9/1999 | Tamori et al. | ............... | 707/203 |
| 6,003,135 A * | 12/1999 | Bialick et al. | ............... | 713/201 |
| 6,134,593 A * | 10/2000 | Alexander et al. | .......... | 713/200 |
| 6,363,423 B1 * | 3/2002 | Chiles et al. | ................ | 709/224 |
| 6,374,315 B1 * | 4/2002 | Okada et al. | ................. | 710/62 |
| 6,671,809 B1 * | 12/2003 | Perona et al. | .................... | 726/3 |
| 6,675,234 B1 * | 1/2004 | Thomsen | ...................... | 710/19 |
| 6,750,830 B1 * | 6/2004 | Teshima et al. | .............. | 345/1.2 |
| 6,804,730 B1 * | 10/2004 | Kawashima | .................. | 710/36 |
| 2002/0090939 A1 * | 7/2002 | Howard | ....................... | 455/422 |
| 2003/0001012 A1 * | 1/2003 | Bermudez | .................... | 235/454 |
| 2003/0009687 A1 * | 1/2003 | Ferchau et al. | ............. | 713/200 |
| 2003/0046337 A1 * | 3/2003 | Strahm et al. | .............. | 709/203 |

FOREIGN PATENT DOCUMENTS

| | | | |
|---|---|---|---|
| WO | 01/86389 | * | 11/2001 |
| WO | 01/86389 A2 | | 11/2001 |

OTHER PUBLICATIONS

Angwin, A.J. "Wireless local and wide area network computing" Nov. 1996, pp. 6/1-6/5.*

* cited by examiner

*Primary Examiner*—Nasser Moazzami
*Assistant Examiner*—Eleni A. Shiferaw
(74) *Attorney, Agent, or Firm*—Thelen Reid Brown Raysman & Steiner LLP (57) ABSTRACT

A platform discrimination indication register is stored in a wireless network card. This register holds a platform discrimination indication that indicates whether the wireless network card can be used to transfer data with notebook computers or whether the wireless network card is restricted to transferring data from a personal digital assistant or defined set of restricted devices. The platform discrimination indication can be upgraded using a key value obtained from an Internet site. This key value is limited to a specific wireless network card because of the use of a unique electronic I.D. An Internet site encrypts the electronic I.D. to produce the first key, such as a platform activation key (PAK). This first key is then decrypted at the personal data device in order to obtain a unique calculated I.D. value. If the calculated I.D. value matches the electronic I.D. value on the wireless network card, then the platform discrimination indication is altered (upgraded), allowing the operation of the wireless network card with notebook computers.

22 Claims, 9 Drawing Sheets

SYSTEM AND METHOD FOR PLATFORM ACTIVATION

BACKGROUND OF THE INVENTION

Data transfer over cellular networks is becoming more and more popular. Data from portable computing devices is transferred across cellular networks for E-mail and to enable Internet access.

Some portable computing devices produce much more cellular data traffic than others. Typically, laptops allow for a far greater amount of data traffic across cellular networks than personal digital assistants (PDAs). The transfer of images and audio files enabled by laptops tend to require a lot of traffic across the cellular network. Personal digital assistants are often limited to E-mail data traffic, and even when they have a World Wide Web connection, browsing tends to require significantly fewer data packet transfers.

In order to enable carriers and service providers to charge PDA users less than laptop users, special cellular wireless network card can be designed to work only with personal digital assistants. This would allow the cellular network to know when a personal digital assistant, rather than a laptop, is connected to the cellular network. The personal digital assistant user can then be billed less than a user who connects using a laptop. The additional production cost and inventory cost of a wireless network card specifically designed for personal digital assistants is prohibitive. It is desired to have a wireless network card that is able to self-determine whether the wireless network card is designated for use with personal digital assistants only.

SUMMARY OF THE INVENTION

The present invention comprises a wireless network card that uses a platform discrimination indicator. The platform discrimination indicator determines whether the wireless network card can be used with laptops in the communications across the cellular network. Preferably, this indicator is stored in non-volatile memory. The use of this indicator in the wireless network card allows the upgrading of the wireless network card from a PDA only mode to a PDA and laptop mode. The upgrade preferably is activated using an electronic I.D. for the wireless network card. The electronic I.D. allows the upgrade to be unique for each wireless network card.

One embodiment of the present invention is a method in which a portable data device wireless network card is checked for a stored platform discrimination indicator. Depending upon the value of the platform discrimination indicator, data transfer is inhibited or allowed by the software or drivers.

Another embodiment of the present invention is a method where the electronic I.D. (EID) of a wireless network card is referenced to a first key value. At a portable data device, not the first device, the EID is used to determine a calculated I.D. value, such as a platform activation key (PAK). At a portable data device, comparing the calculated I.D. value to the electronic I.D. of the wireless network card, so that if the calculated I.D. value matches the electronic I.D. of the wireless network card, data transmissions from the portable data device, through the wireless network card, are enabled. The enabling described above is preferably done by modifying the platform discrimination indicator on the wireless network card. In the manner described above, the upgrade of the wireless network card is limited to a specific wireless network card, and a user could not update a large number of wireless network cards after paying a single upgrade fee.

Another embodiment of the present invention comprises a wireless network card for use with portable data devices. The wireless network card includes a stored platform discrimination indication. The value of the discrimination indication determines whether the wireless network card can be used with a given type of portable data device. One value of the platform discrimination indication allows the wireless network card to be used with a restricted set of portable data devices. Another value of the platform discrimination indication allows the use of the wireless network card with an expanded set of portable data devices. The expanded set of portable data devices includes the restricted set of portable data devices, as well as additional portable data devices not included in the restricted set of portable data devices. In one example, the restricted set of portable data devices includes PDAs and the expanded set of portable data devices includes both PDAs and laptops.

Another embodiment of the present invention is a wireless network card software driver for a portable data device. The wireless network card software driver is adapted to check the wireless network card for platform discrimination indicator, and use the platform discrimination indicator to determine whether to enable data transfer using the wireless network card. If the data transfer is not enabled, the user is prompted for a key value. The key value is used to determine a calculated I.D. value. The calculated I.D. value is compared with an I.D. value obtained from the wireless network card. If the calculated I.D. value matches the I.D. value obtained from the wireless network card, the platform discrimination indication in the wireless network card is modified to enable data transfer using the wireless network card.

DETAILED DESCRIPTION OF THE PREFERRED EMBODIMENT

Figure 1:
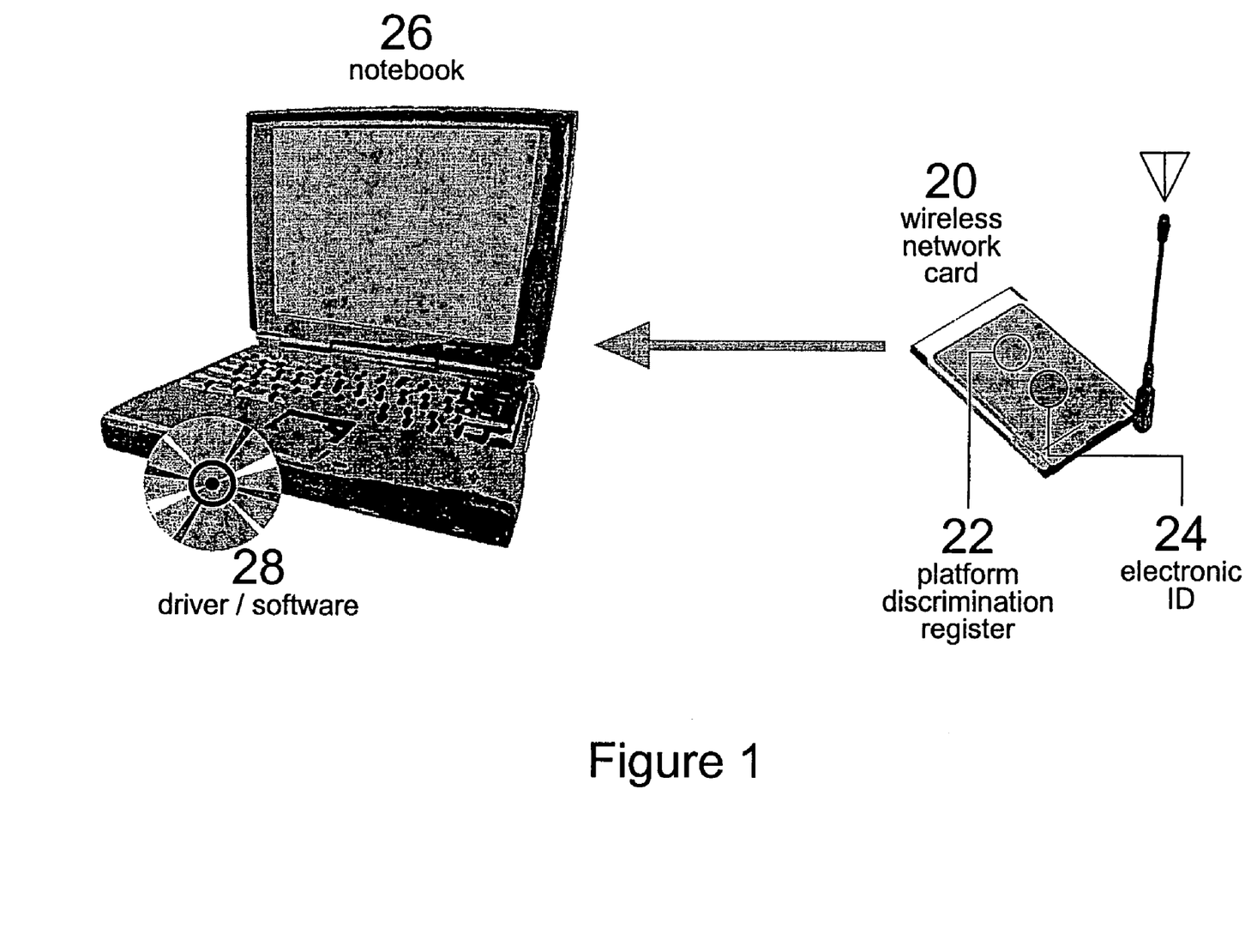
FIG. 1 is a diagram illustrating a wireless network card, including the platform discrimination indicator and an electronic I.D.

FIG. 1 illustrates the wireless network card 20. The wireless network card 20 includes a platform discrimination register 22 which can be used to store the platform discrimination indicator. The platform discrimination indicator in one embodiment is a single bit of a control register. The platform discrimination indicator indicates whether the wireless network card can be used to transfer data with a given type of personal data device. In one embodiment, software and drivers on certain personal data devices, such as notebook computers require that the platform discrimination indications be a certain value before allowing the transfer of data with the wireless network card unit across the cellular network.

Also shown in the wireless network card 20 is an electronic I.D. location 24. This electronic I.D. is a unique I.D. for each wireless network card. One example of a possible electronic I.D. is a specified serial number for the wireless network card.

The wireless network card in this example is attached to a notebook computer 26. The notebook computer 26 includes a wireless network card driver software 28. As described below, the wireless network card driver software checks the platform discrimination indicator to make sure that it is of a certain value which allows the wireless network card to transfer data across the cellular network. If not, as described below, it will prompt the user to enter an upgrade code which the user can obtain to produce an upgrade for the wireless network card 20.

Figure 2:
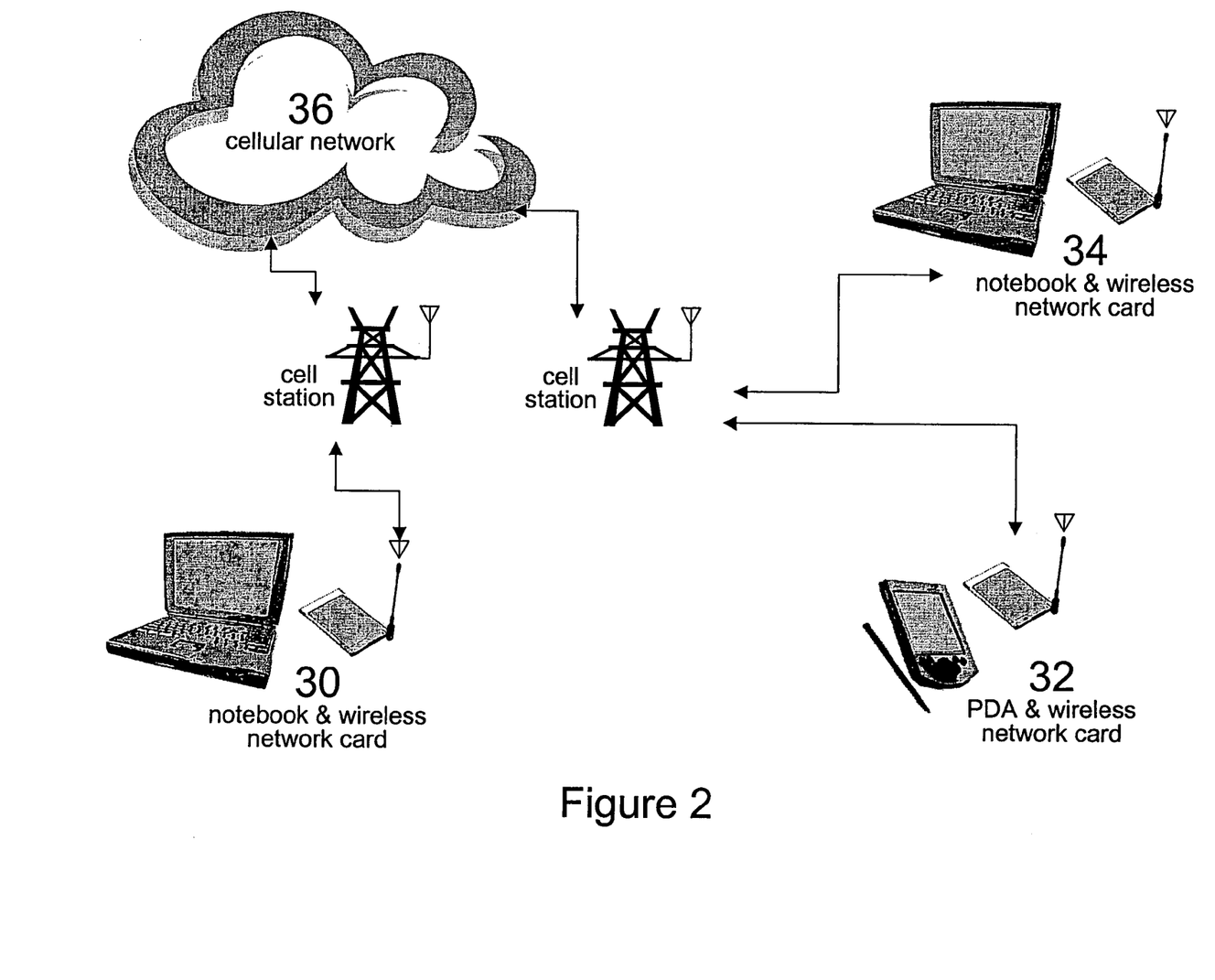
FIG. 2 is a diagram illustrating the interconnection of the devices using the wireless network card with the cellular network.

FIG. 2 illustrates wireless network cards 30, 32, 34 connecting to the cellular network 36. The wireless network cards can be connected to notebook or laptop computers (which are capable of a relatively large wireless data transfers) as well as to personal digital assistants (which typically require smaller data transfers). The use of the platform discrimination indicator allows for the same wireless network card design to be restricted to PDAs or unrestricted, for use on all platforms, depending upon the value of the platform discrimination indicator.

Figure 3:
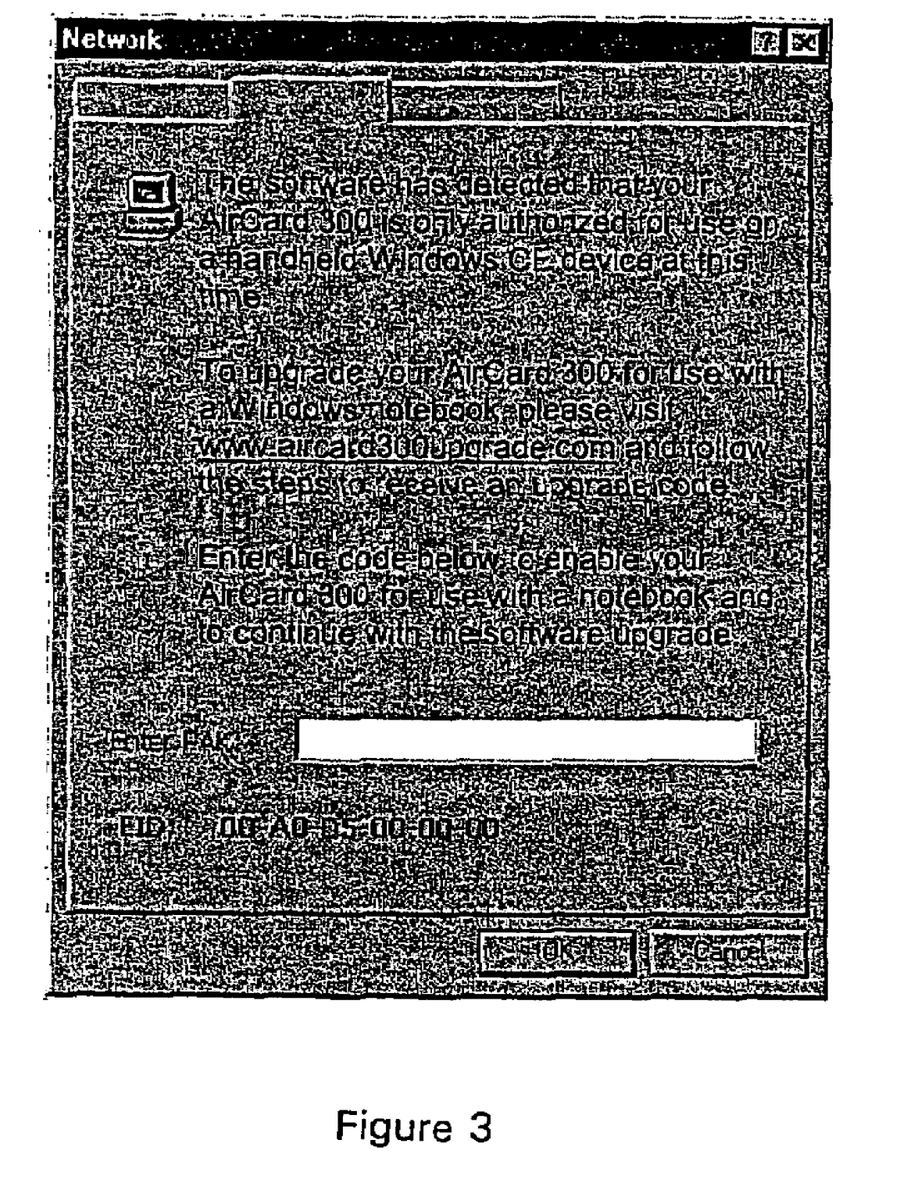
FIG. 3 is a diagram illustrating an interface produced by a laptop computer when the wireless network card does not have the platform discrimination indicator on the wireless network card does not allow operation with a laptop.

FIG. 3 is an example of an interface display produced by the notebook computer when the notebook computer determines that the platform discrimination register will not allow data transfer through the wireless network card, due to the value of the platform discrimination indicator. This display requests the user to obtain a code to upgrade the wireless PC card operation. Also shown is the electronic I.D. code which the notebook computer obtains from the attached wireless network card.

Figure 4A:
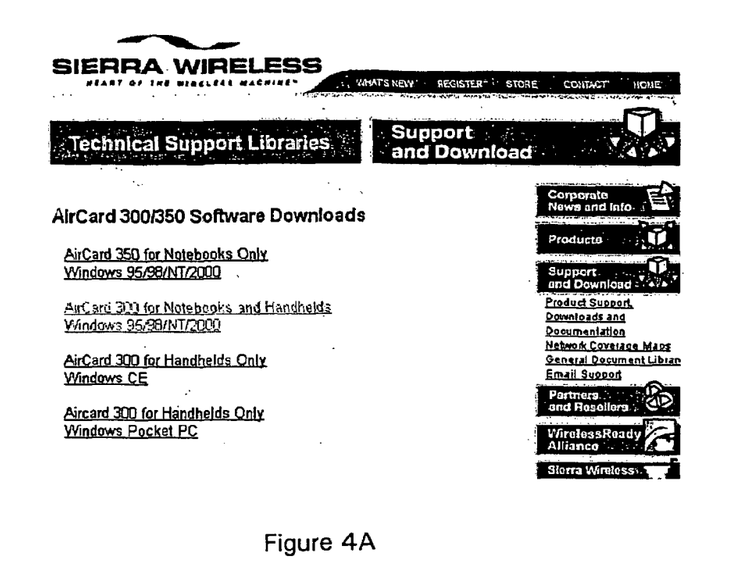
FIGS. 4A-4C illustrate web pages which can be used for obtaining an upgrade code for a wireless network card.
Figure 4B:
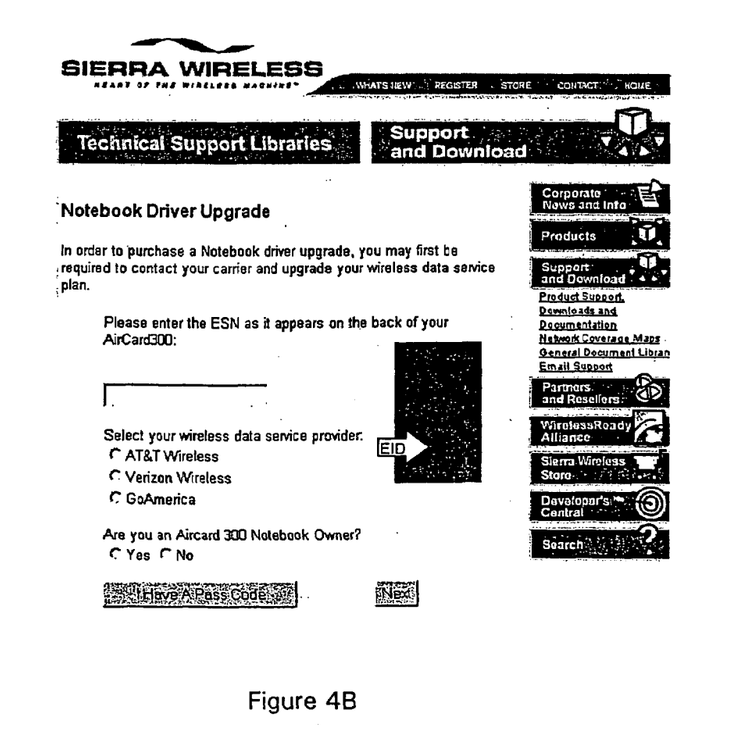
Figure 4C:
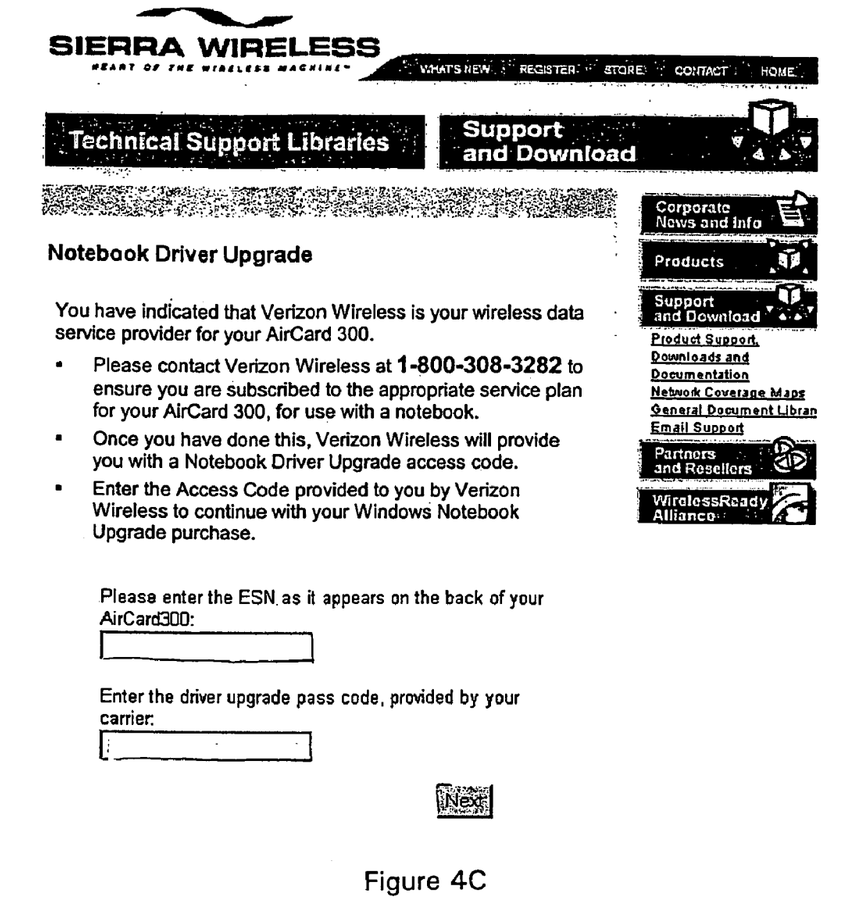

FIGS. 4A-4C illustrate the connection to a web page to obtain the notebook upgrade. In FIG. 4B, the user enters the electronic I.D. or serial number of the wireless network card, as well as indicating the wireless data source provider. In one example, it is requested that the user obtain an upgrade pass code from the carrier. This, along with the electronic I.D. code, allows the system to provide the upgrade code permitting the notebook computer to allow cellular transmissions from the wireless network card with the source being the notebook computer.

Figure 5:
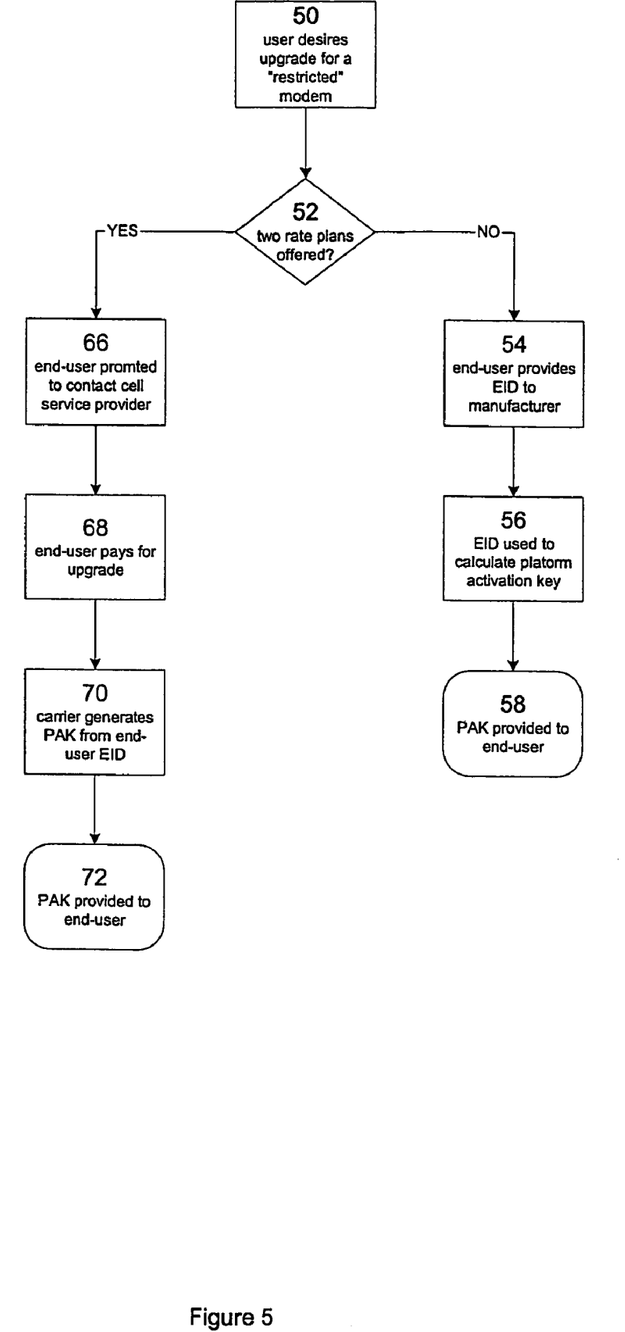
FIG. 5 is a flowchart illustrating obtaining a code to upgrade the wireless network card.

FIG. 5 illustrates the operation of the upgrade system. In step 50, the user desires an upgrade. In step 52, it is checked whether the cell service provider offers more than one rate, and would charge more for the upgrade. If not, in step 54, the user optionally pays the wireless PC card company money for the upgrade and provides the electronic I.D. In step 56, the electronic I.D. is used to calculate the platform activation key (PAK). In step 58, the PAK is provided to the user. As will be described below, the PAK can be used by the notebook computer to determine whether to upgrade the status of the wireless network card by modifying the platform discrimination indication.

If the cell service provider does charge more for an upgrade, in one example, in step 60, the user gets authorization from the cell service provider for a specific PAK and this pass code is provided. In step 62, the electronic I.D. is used to calculate the platform activation key, and the platform activation key is provided to the user.

Figure 6:
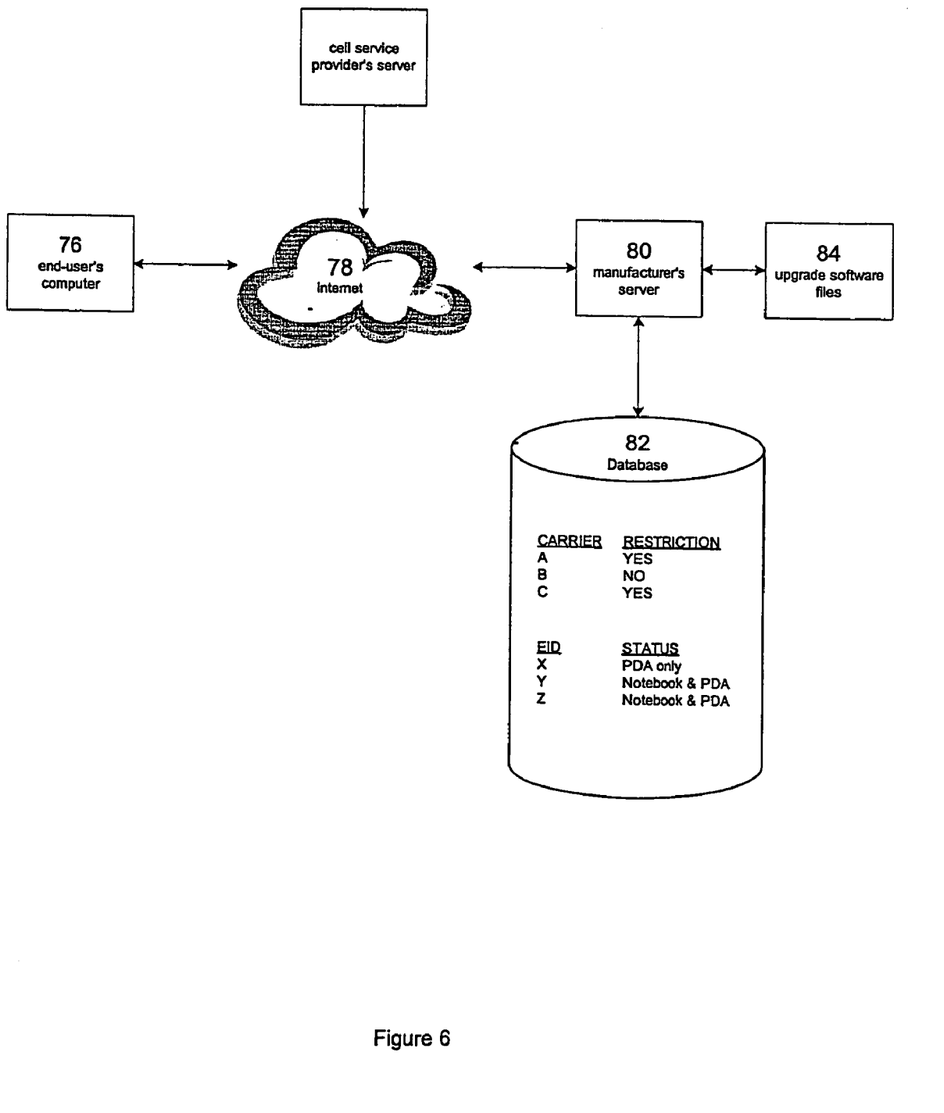
FIG. 6 is a diagram illustrating the systems for use with the present invention.

FIG. 6 illustrates a system in which the user computer 76 is connected to the Internet 78 and to the wireless PC card company server 80. The wireless PC card company server 80 uses the data base containing a list of the carriers and their restrictions, as well as an indication for each wireless network card electronic I.D. of the data transfer status, whether the operation is limited to a PDA or can be used with a PDA and a notebook type computer. In one embodiment, once there is an upgrade done for a specific wireless network unit, the status is modified in the database 82. Also associated with the wireless network card company server 80 is the number of upgrade software files 84, which allow the software driver at the notebook computer to be upgraded.

Figure 7:
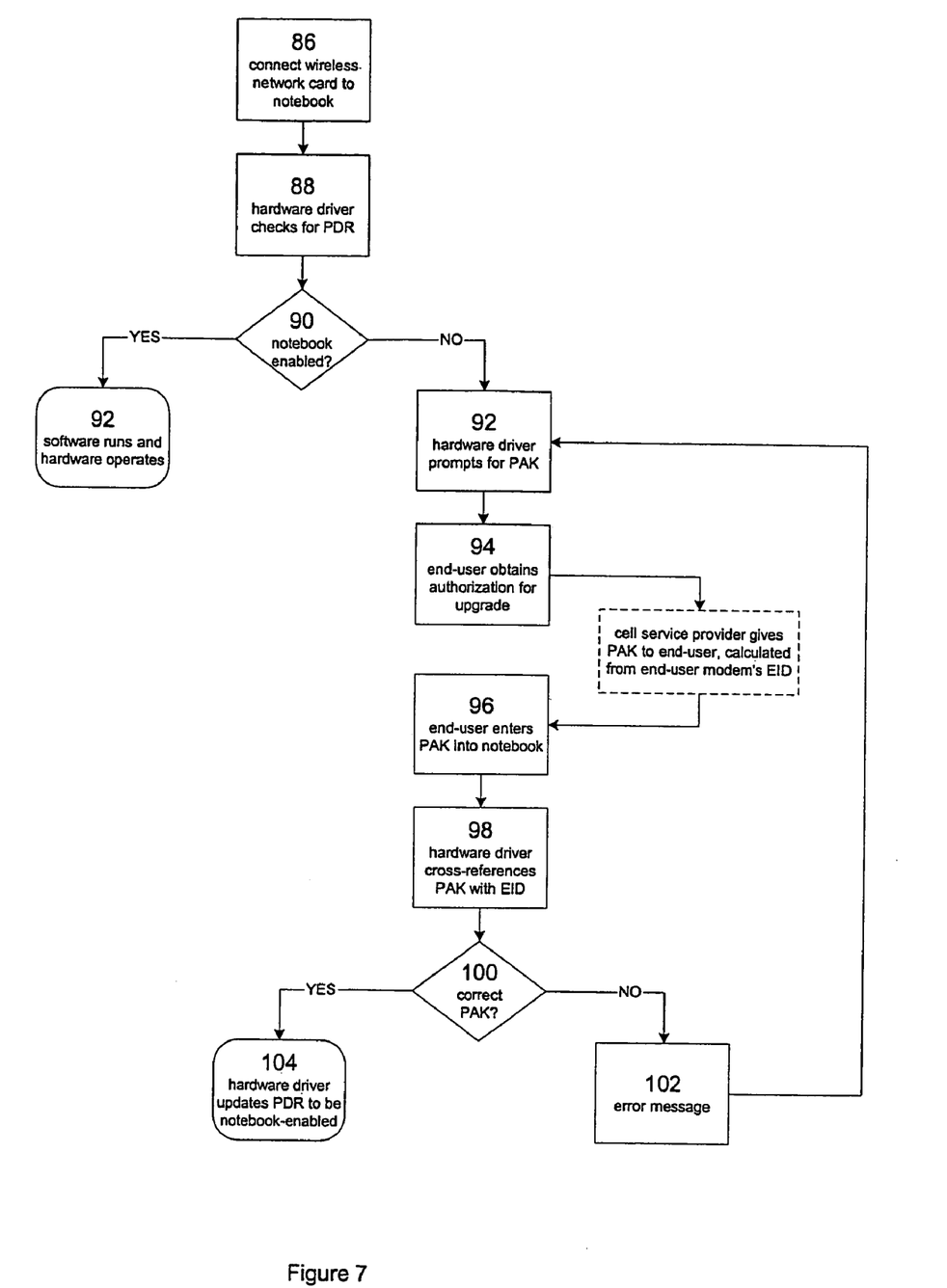
FIG. 7 is a diagram illustrating operation of a notebook computer interacting with the wireless network card to determine whether to allow cellular transmissions across the cellular network.

FIG. 7 is a flowchart illustrating the operation of one embodiment of the present invention. In step 86, the wireless network card is connected to, the notebook computer. In step 88, the wireless PC card driver installed on the notebook computer checks the platform discrimination register in the wireless network card. In step 90, it is checked whether notebook wireless PC card operation is allowed. If so, the wireless PC card operates in step 92. If not, the wireless PC card driver requests the platform activation key in step 92. In step 94, the user obtains authorization for an upgrade. The authorizing agent, such as the service provider or wireless PC card company, uses the electronic I.D. of the wireless network card to calculate a platform activation key. In step 96, the user provides a platform activation key. In step 98, the wireless PC card driver uses a platform activation to calculate an electronic I.D. In step 100, it is checked whether the calculated electronic I.D. matches the wireless network card electronic I.D. If not, in step 102, an error message is produced and the wireless network unit will not function on that platform. If it does, in step 104, the wireless PC card driver upgrades the platform discrimination register in the wireless network card, and cellular data transfer is allowed specific to that wireless network card, regardless of the platform.

Figure 8A:
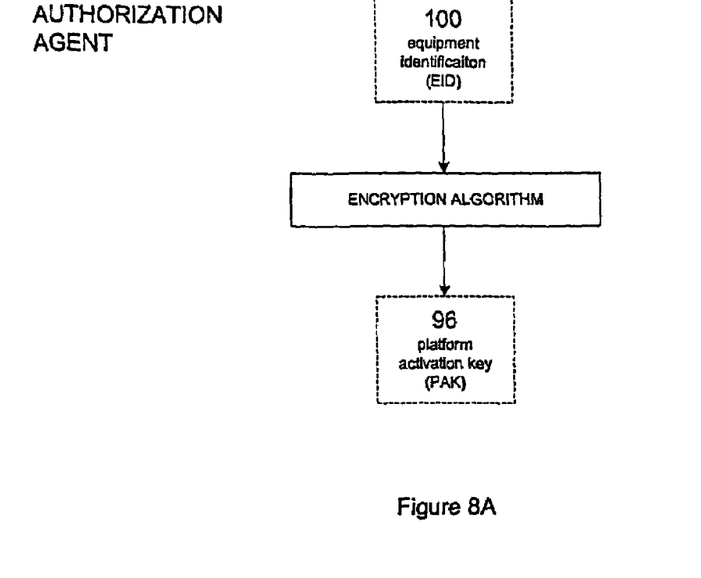
FIGS. 8A and 8B illustrate encryption operations used to obtain a code for the wireless network cards.
Figure 8B:
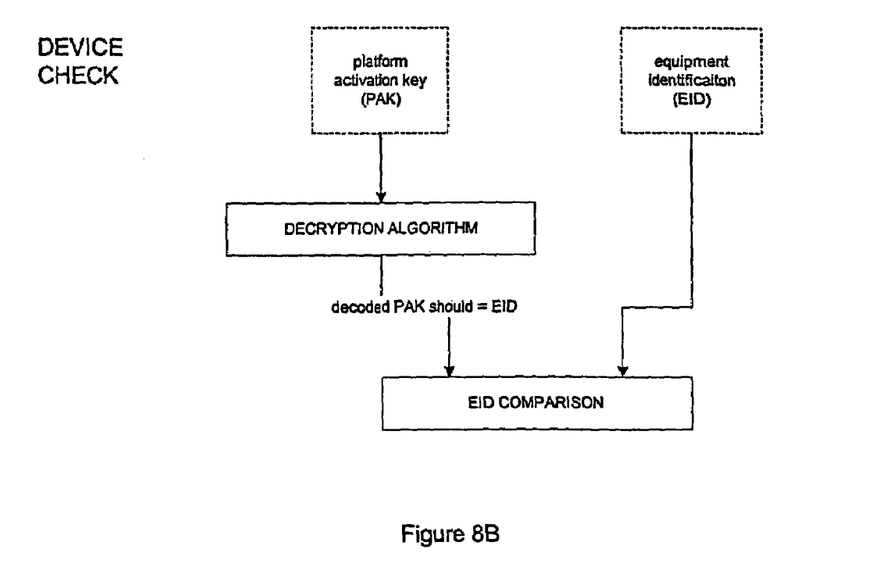

FIGS. 8A and 8B illustrate the calculation of the platform activation key and the use of the platform activation key to produce a decoded electronic I.D. In a preferred embodiment, this is done by using an encryption algorithm. At the authorization agent, an electronic I.D. is used in an encryption algorithm to produce the platform activation key. At the device, in FIG. 8B, the platform activation key is decrypted to produce a decoded electronic I.D. value. This decoded electronic I.D. value is compared to the wireless network card electronic I.D. in a compare operation. If they match, an upgrade of the wireless network card is allowed. In a preferred embodiment, the encryption algorithm is kept secret from the user to prevent the user from deriving a platform activation key for a given wireless network card. It is important that the electronic encryption algorithm not be breakable or, otherwise, the duplication of the electronic encryption algorithm, distributed over the Internet, would allow the users to bypass the system of the present invention. It is also important that the decryption algorithm in notebook computers not be able to be analyzed to determine the encryption algorithm. A number of encryption/decryption algorithms commercially available fit these requirements.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method comprising:

in a portable data device, checking a wireless network card for a stored platform discrimination indication, the platform discrimination indication dependent upon a wireless data transfer capacity of the portable data device;

and depending on a value of the platform discrimination indication, inhibiting or allowing data transfer, across a wireless network, using the wireless network card, one value of the platform discrimination indication allowing the wireless network card to be used with a restricted set of portable data device types, another value of the platform discrimination indication allowing the use of the wireless network card with an expanded set of portable data device types, the expanded set of portable data devices including the restricted set of portable data devices as well as additional portable data devices not included in the restricted set of portable data devices wherein the restricted set of portable data devices includes a personal digital assistant but does not include notebook computers;

said additional portable data devices comprising said notebook computers; and wherein said platform discrimination indication capable of being upgraded from restricted set of portable data devices to expanded set.

2. The method of claim 1 wherein if the data transfer is inhibited, the portable data device requests an upgrade key value.

3. The method of claim 2 wherein if an upgrade key value is provided by a user, the portable data device calculates a unique calculated I.D. value.

4. The method of claim 3 wherein the calculated I.D. value is compared to a unique electronic I.D. value stored in the wireless network card.

5. The method of claim 4 wherein if the calculated I.D. value matches the electronic I.D. value of the wireless network card, transmissions from the portable computer to the wireless network card are enabled.

6. The method of claim 5 wherein the platform discrimination indication indicates the value in the wireless network card is modified when transmissions are enabled.

7. The method of claim 2 wherein the key value is obtained by providing the unique electronic I.D. value of the wireless network card to a program that calculates the key value.

8. A method comprising: at a first device, using an input electronic ID of a wireless network card to determine a first key value; at a portable data device not the first device, using the first key value to calculate a calculated ID value; and at the portable data device, comparing the calculated ID value to the electronic ID of the wireless network card so that if the calculated ID value matches the electronic ID of the wireless network card data transmissions from the portable data device through the wireless network card, across a wireless network, are enabled by modifying a stored platform discrimination indication, the platform discrimination indication dependent upon a wireless data transfer capacity of the portable data device, one value of the platform discrimination indication allowing the wireless network card to be used with a restricted set of portable data device types, another value of the platform discrimination indication allowing the use of the wireless network card with an expanded set of portable data device types, the expanded set of portable data devices including the restricted set of portable data devices as well as additional portable data devices not included in the restricted set of portable data devices wherein the restricted set of portable data devices includes a personal digital assistant but does not include notebook computers; said additional portable data devices comprising said notebook computers; and wherein said platform discrimination indication capable of being upgraded from restricted set of portable data devices to expanded set.

9. The method of claim 8 wherein the first key is a platform activator key.

10. The method of claim 8 wherein when the calculated I.D. value matches the electronic I.D. value of the wireless network card, a platform discrimination indication on the wireless network card is modified.

11. The method of claim 10 wherein the platform discrimination indication is checked before transmitting from the wireless network card using one type of portable data device.

12. The method of claim 11 wherein other types of portable data devices do not require a check of the platform discrimination indication before operation.

13. The method of claim 8 in which fees are charged when the first device provides the first key value.

14. The method of claim 8 wherein the production of the key value is done using an encryption algorithm.

15. The method of claim 8 wherein the production of the calculated I.D. value is done using an decryption algorithm.

16. The method of claim 8 wherein the portable data device includes a device driver.

17. The method of claim 8 in which a cell service provider is used to provide the first key value.

18. The method of claim 8 wherein the electronic I.D. value is stored on the wireless network card.

19. The method of claim 18 in which a personal computer obtains the electronic I.D. from the wireless network card electronically.

20. A wireless network card for use with portable data devices, the wireless network card including a stored platform discrimination indication, the platform discrimination indication dependent upon a wireless data transfer capacity of the portable data device; a value of the platform discrimination indication determining whether the wireless network card can be used with a type of the portable data device to transfer data across a wireless network, one value of the platform discrimination indication allowing the wireless network card to be used with a restricted set of portable data device types, another value of the platform discrimination indication allowing the use of the wireless network card with an expanded set of portable data device types, the expanded set of portable data devices including the restricted set of portable data devices as well as additional portable data devices not included in the restricted set of portable data devices wherein the restricted set of portable data devices includes a personal digital assistant but does not include notebook computers; said additional portable data devices comprising said notebook computers; and wherein said platform discrimination indication capable of being upgraded from restricted set of portable data devices to expanded set.

21. A wireless network card software driver for a portable data device, the wireless network card software driver adapted to implement the steps of: checking the wireless network card for a platform discrimination indication the platform discrimination indication dependent upon a wireless data transfer capacity of the portable data device; using the platform discrimination indication to determine whether to enable data transfer, across a wireless network, one value of the platform discrimination indication allowing the wireless network card to be used with a restricted set of portable data device types, another value of the platform discrimination indication allowing the use of the wireless network card with an expanded set of portable data device types, the expanded set of portable data devices including the restricted set of portable data devices as well as additional portable data devices not included in the restricted set of portable data devices wherein the restricted set of portable data devices includes a personal digital assistant but does not include notebook computers; said additional portable data devices comprising said notebook computers; and wherein said platform discrimination indication capable of being upgraded from restricted set of portable data devices to expanded set.

22. A wireless network card for use with portable data devices, the wireless network card including a stored platform discrimination indication, the platform discrimination indication dependent upon a wireless data transfer capacity of the portable data device; a value of the platform discrimination indication determining whether the wireless network card can be used with a type of portable the data device to transfer data across a wireless network, one value of the platform discrimination indication allowing the wireless network card to be used with a restricted set of portable data device types, another value of the platform discrimination indication allowing the use of the wireless network card with an expanded set of portable data device types, the expanded set of portable data devices including the restricted set of portable data devices as well as additional portable data devices not included in the restricted set of portable data devices, the platform discrimination indication capable of being upgraded from the restricted set of portable data devices to the expanded set through a process wherein a user takes an electronic I.D. of the wireless network card, uses the electronic I.D. of the wireless network card to produce a first key value, this first key value is then used by the personal portable data device to calculate a calculated I.D., if the calculated I.D. matches the electronic I.D. of the wireless network card, the platform discrimination indication is modified to allow the wireless network card to operate with the expanded set of portable data devices; said additional portable data devices comprising said notebook computers; and wherein said platform discrimination indication capable of being upgraded from restricted set of portable data devices to expanded set.

* * * * *